(12) United States Patent
Su et al.

(10) Patent No.: US 10,047,918 B2
(45) Date of Patent: Aug. 14, 2018

(54) OPTICAL MODULE

(71) Applicant: PlayNitride Inc., Tainan (TW)

(72) Inventors: Po-Jen Su, Tainan (TW); Gwo-Jiun Sheu, Tainan (TW); Kuan-Yung Liao, Tainan (TW); Sheng-Yuan Sun, Tainan (TW)

(73) Assignee: PlayNitride Inc., Tainan (TW)

( * ) Notice: Subject to any disclaimer, the term of this patent is extended or adjusted under 35 U.S.C. 154(b) by 105 days.

(21) Appl. No.: 14/844,000

(22) Filed: Sep. 3, 2015

(65) Prior Publication Data

US 2016/0097494 A1   Apr. 7, 2016

(30) Foreign Application Priority Data

Oct. 1, 2014   (TW) .............................. 103134207 A

(51) Int. Cl.
| | |
|---|---|
| *F21V 99/00* | (2006.01) |
| *F21K 99/00* | (2016.01) |
| *F21V 14/04* | (2006.01) |
| *G02B 26/00* | (2006.01) |
| *F21V 14/02* | (2006.01) |

(Continued)

(52) U.S. Cl.
CPC .................. *F21K 9/56* (2013.01); *F21K 9/64* (2016.08); *F21V 9/16* (2013.01); *F21V 9/30* (2018.02); *F21V 9/32* (2018.02); *F21V 9/38* (2018.02); *F21V 14/02* (2013.01); *F21V 14/04* (2013.01); *G02B 26/007* (2013.01); *F21V 5/04* (2013.01); *F21V 9/35* (2018.02); *F21Y 2115/30* (2016.08)

(58) Field of Classification Search
CPC ................................ F21K 9/64; G02B 26/007
See application file for complete search history.

(56) References Cited

U.S. PATENT DOCUMENTS

| 5,938,319 A | * | 8/1999 | Hege ........................ B60Q 1/00 |
| | | | 362/459 |
| 8,496,352 B2 | * | 7/2013 | Bartlett ................ G03B 21/204 |
| | | | 362/231 |

(Continued)

FOREIGN PATENT DOCUMENTS

| CN | 202615106 | 12/2012 |
| CN | 103105659 | 5/2013 |

(Continued)

OTHER PUBLICATIONS

"Office Action of Taiwan Counterpart Application", dated Jul. 28, 2015, p. 1-p. 7.

*Primary Examiner* — Zheng Song
(74) *Attorney, Agent, or Firm* — JCIPRNET

(57) ABSTRACT

An optical module including a light source, an adjustable reflector and a wavelength conversion set is provided. The adjustable reflector is disposed in a light path of light emitted from the light source and adaptable to adjust between a first position and a second position. The wavelength conversion set includes a first wavelength conversion member and a second wavelength conversion member. When the adjustable reflector is at the first position, light emitted from the light source is reflected to the first wavelength conversion member by the adjustable reflector. When the adjustable reflector is at the second position, light emitted from the light source is reflected to the second wavelength conversion member by the adjustable reflector.

15 Claims, 2 Drawing Sheets

(51) Int. Cl.
*F21V 9/30* (2018.01)
*F21V 9/32* (2018.01)
*F21V 9/38* (2018.01)
*F21V 9/16* (2006.01)
*F21K 9/64* (2016.01)
*F21V 5/04* (2006.01)
*F21V 9/35* (2018.01)
*F21Y 115/30* (2016.01)

(56) References Cited

U.S. PATENT DOCUMENTS

| | | | | |
|---|---|---|---|---|
| 2004/0223333 | A1* | 11/2004 | Lee | F21S 48/1742 362/424 |
| 2009/0046474 | A1* | 2/2009 | Sato | B60Q 1/076 362/466 |
| 2011/0211333 | A1* | 9/2011 | Bartlett | G03B 21/204 362/84 |
| 2012/0051074 | A1* | 3/2012 | Takahashi | F21S 48/1145 362/509 |
| 2013/0092965 | A1* | 4/2013 | Kijima | F21V 3/04 257/98 |
| 2013/0215635 | A1* | 8/2013 | Boyd, Jr. | F21S 48/13 362/518 |
| 2013/0250381 | A1* | 9/2013 | Toko | G02B 5/32 359/19 |
| 2014/0016322 | A1* | 1/2014 | Lu | F21V 14/04 362/282 |
| 2015/0049457 | A1* | 2/2015 | Kroell | G01N 21/8806 362/84 |
| 2015/0176811 | A1* | 6/2015 | Schwaiger | F21S 48/1757 362/84 |
| 2015/0184830 | A1* | 7/2015 | Nagao | F21V 29/70 362/583 |
| 2015/0252964 | A1* | 9/2015 | Takahashi | F21K 9/60 362/84 |
| 2015/0345728 | A1* | 12/2015 | Tsuda | F21S 48/1208 362/511 |
| 2015/0362154 | A1* | 12/2015 | Liao | F21V 13/08 362/84 |
| 2017/0241619 | A1* | 8/2017 | Fidler | C09K 11/7706 |

FOREIGN PATENT DOCUMENTS

| | | |
|---|---|---|
| CN | 203489180 | 3/2014 |
| CN | 203535312 | 4/2014 |
| TW | 200728660 | 8/2007 |
| TW | I343978 | 6/2011 |

* cited by examiner

OPTICAL MODULE

CROSS-REFERENCE TO RELATED APPLICATION

This application claims the priority benefit of Taiwan application serial no. 103134207, filed on Oct. 1, 2014. The entirety of the above-mentioned patent application is hereby incorporated by reference herein and made a part of this specification.

BACKGROUND OF THE INVENTION

Field of the Invention

The invention is related to an optical module, and particularly related to an optical module which may emit light having different colors.

Description of Related Art

With the maturity of photoelectric technology, the lighting emitting mechanism of a light source has developed from thermoluminescence to electroluminescence (EL). Generally speaking, the light source that adopts the EL mechanism has narrower range of emission wavelength. In order to acquire different emission color or broader range of emission wavelength, it is common to utilize a wavelength conversion member (e.g. a phosphor-containing gel) to convert the wavelength of the light emitted by the light source.

In a conventional light-emitting device, the phosphor-containing gel is usually disposed in one side of the light source, such that the light emitted by the light source passes through the phosphor-containing gel and is converted by the phosphor-containing gel into a light with different wavelength. However, the color of the converted light is restricted to the type of the phosphor and the user does not have the chance to choose the color of the light to be converted depending on the circumstances.

SUMMARY OF THE INVENTION

The invention provides an optical module which may be adjusted to emit light with different colors.

In the invention, an optical module includes a light source, an adjustable reflector and a wavelength conversion set. The adjustable reflector is disposed in a light path of the light emitted by the light source and adaptable to adjust between a first position and a second position. The wavelength conversion set includes a first wavelength conversion member and a second wavelength conversion member. When the adjustable reflector is disposed at the first position, the light emitted by the light source is reflected to the first wavelength conversion member by the adjustable reflector. When the adjustable reflector is disposed at the second position, the light emitted by the light source is reflected to the second wavelength conversion member by the adjustable reflector.

In an embodiment of the invention, the adjustable reflector adjusts in a continuous manner.

In an embodiment of the invention, the adjustable reflector adjusts in a step-by-step manner.

In an embodiment of the invention, a lens set is further included, and the wavelength conversion set is disposed between the adjustable reflector and the lens set.

In an embodiment of the invention, the wavelength conversion set is disposed on a focal point of the lens set.

In an embodiment of the invention, a reflective cover is further included. The reflective cover has an opening and the wavelength conversion set is disposed in the opening of the reflective cover.

In an embodiment of the invention, the light source is a laser light source.

In the invention, an optical module includes an adjustable light source, a reflector and a wavelength conversion set. The adjustable light source is adaptable to move along an axis between a first position and a second position. The reflector is disposed in a light path of the light emitted by the adjustable light source. The wavelength conversion set includes a first wavelength conversion member and a second wavelength conversion member surrounding the first wavelength conversion member. When the adjustable light source is at the first position, the light emitted by the adjustable light source is reflected to the first wavelength conversion member by the reflector. When the adjustable light source is at the second position, the light emitted by the adjustable light source is reflected to the first wavelength conversion member and the second wavelength conversion member by the reflector.

In an embodiment of the invention, the adjustable light source moves in a continuous manner.

In an embodiment of the invention, the adjustable light source moves in a step-by-step manner.

In an embodiment of the invention, a lens set is further included. The wavelength conversion set is disposed between the reflector and the lens set.

In an embodiment of the invention, the wavelength conversion set is disposed on a focal point of the lens set.

In an embodiment of the invention, a reflective cover is further included. The reflective cover has an opening and the wavelength conversion set is disposed in the opening of the reflective cover.

In an embodiment of the invention, the light source is a laser light source.

Based on the above, in the invention, the optical module adjusts the position of the reflector or light source to change of light path of the light to the first wavelength conversion member, the second wavelength conversion member, a boundary between the first wavelength conversion member and the second wavelength conversion member, or that the light is incident to the first wavelength converting member and the second wavelength conversion member at the same time such that the light leaving the optical module may have a different color to meet the user's need. The optical module is not only easy to use, and it also has a small size which requires only little space for the reflector to rotate or for the light source to move.

In order to make the aforementioned features and advantages of the disclosure more comprehensible, embodiments accompanying figures are described in detail below.

DESCRIPTION OF EMBODIMENTS

Figure 1:
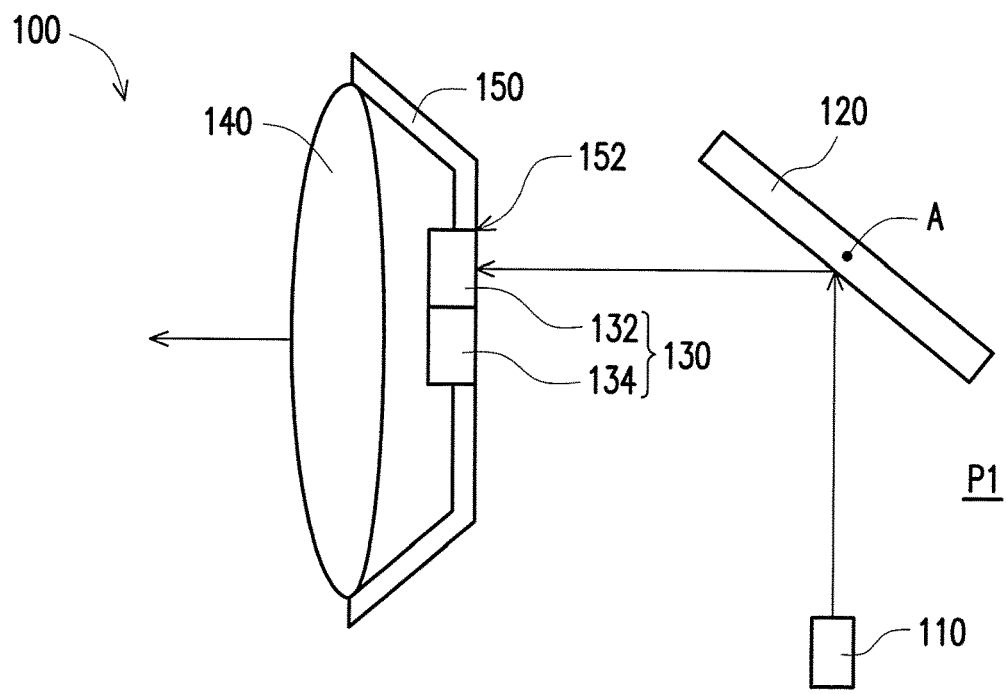
FIG. 1 is a schematic view illustrating that an adjustable reflector of an optical module is at a first position according to an embodiment of the invention.
Figure 2:
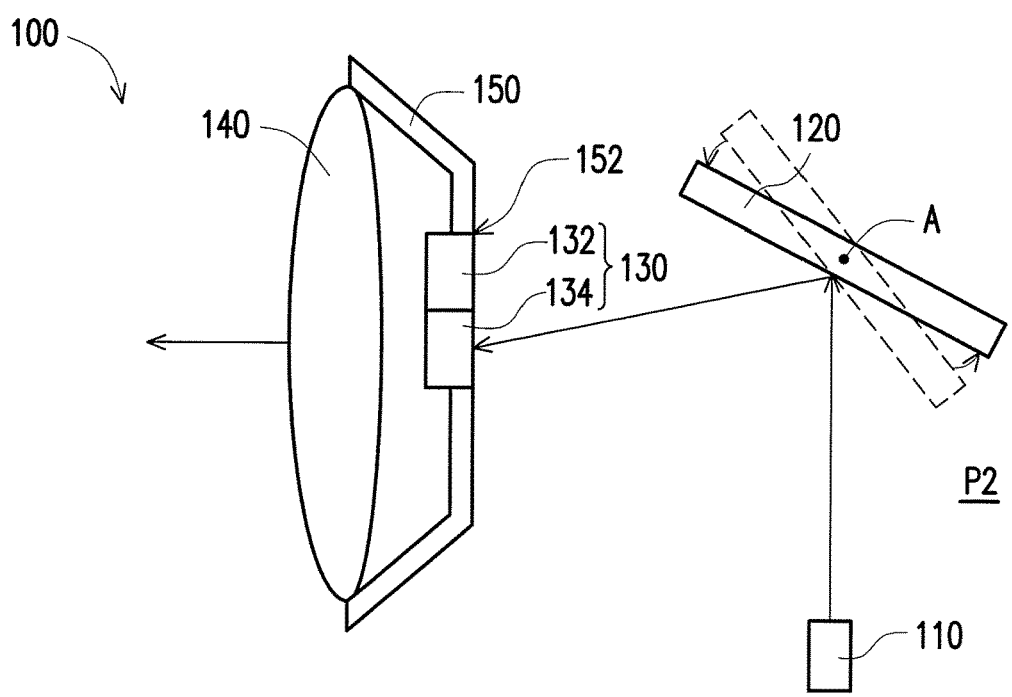
FIG. 2 is a schematic view illustrating that the adjustable reflector of the optical module in FIG. 1 is at a second position.

FIG. 1 is a schematic view illustrating that an adjustable reflector of an optical module is at a first position according to an embodiment of the invention. FIG. 2 is a schematic view illustrating that the adjustable reflector of the optical module in FIG. 1 is at a second position. Referring to FIGS. 1-2, an optical module 100 of the embodiment includes a light source 110, an adjustable reflector 120 and a wavelength conversion set 130.

The adjustable reflector 120 is disposed in a light path of the light emitted by the light source 110 and adaptable to adjust between a first position P1 and a second position P2. In the embodiment, the adjustable reflector 120 may rotate along an axis A (due to the viewing angle of FIG. 1, the axis A is shown as a single point) to adjust the angle and light path of the light to be reflected after being incident to the adjustable reflector 120. In the embodiment, the adjustable reflector 120 may be linked to a knob (not shown), the angle of the adjustable reflector 120 may be adjusted by the means of rotating the knob. Certainly, in other embodiment, the user may adjust the angle of the adjustable reflector 120 by directly rotating the adjustable reflector 120; the invention provides no limitation to the manner of adjusting the adjustable reflector 120.

In addition, in the embodiment, the adjustable reflector 120 is adjusted by the means of uniaxial rotation. However, in other embodiment, the adjustable reflector 120 may be designed to move along a uniaxial direction. Alternatively, the adjustable reflector 120 may rotate or move along dual axes; the invention provides no limitation to the way of adjusting the adjustable reflector 120.

The wavelength conversion set 130 includes a first wavelength conversion member 132 and a second wavelength conversion member 134. In the embodiment, the first wavelength conversion member 132 and the second wavelength conversion member 134 are adjacent to each other, such that the size of the optical module 100 may be reduced. Here, two wavelength conversion members are disclosed; however, in other embodiment that is not disclosed, the wavelength conversion set may include more than two wavelength conversion members, such as multiple wavelength conversion members arranged in a matrix, which should not be construed as a limitation. Furthermore, the first wavelength conversion member 132 and the second wavelength conversion member 134 respectively convert the wavelength of the light emitted by the light source 110 into wavelength of other light. For instance, the light emitted by the light source 110 is, for example, blue light. The first wavelength conversion member 132 may, for example, convert the blue light into yellow light; the second wavelength conversion member 134 may, for example, convert the blue light into red light and the like. However, the invention provides no limitation to the wavelength of the light emitted by the light source 110; also, the invention provides no limitation to the type of wavelength acquired after conversion of the first wavelength conversion member 132 and the second wavelength conversion member 134.

In the embodiment, a fluorescent block having a monocrystalline structure may be selected to be used as the first wavelength conversion member 132 and the second wavelength conversion member 134, and the fluorescent block is then polished into a desired form. However, in other embodiments, the first wavelength conversion member 132 and the second wavelength conversion member 134 may also be formed by solidifying a transparent gel mixed with a phosphor powder material, a phosphorescent material, or dyes. As far as the transparent gel mixed with the phosphor powder material is concerned, the transparent gel may be epoxy resin, acrylic resin, silicone resin or silica gel. The transparent gel may be mixed with single colored or multi-colored phosphor powder materials. For example, a yellow phosphor powder material or a green phosphor powder material includes components such as Sr, Ga, S, P, Si, O, Gd, Ce, Lu, Ba, Ca, N, Si, Eu, Y, Cd, Zn, Se, and Al. For example, the phosphor powder may be garnet phosphor, silicate phosphor, nitrogen compound phosphor, or oxide-nitride compound phosphor. The phosphor powder may also be yttrium aluminum garnet (YAG) phosphor, terbium aluminum garnet (TAG) phosphor, eu-activated alkaline earth silicate phosphor, or sialon phosphor. In another embodiment, the first wavelength conversion member 132 and the second wavelength conversion member 134 may also be formed into a block by sintering laminated polycrystalline powder containing phosphor powder. Certainly, varieties of the first wavelength conversion member 132 and the second wavelength conversion member 134 in the above embodiments are not limited thereto.

As shown by FIG. 1, when the adjustable reflector 120 is at the first position P1, the light emitted by the light source may be reflected by the adjustable reflector 120 to the first wavelength conversion member 132. The first wavelength conversion member 132 may convert the wavelength of the light emitted by the light source 110 into a longer wavelength, for example, convert the blue light into yellow light.

As shown by FIG. 2, when the adjustable reflector 120 is at the second position P2, the light emitted by the light source may be reflected by the adjustable reflector 120 to the second wavelength conversion member 134. The second wavelength conversion member 134 may convert the wavelength of the light emitted by the light source 110 into another longer wavelength, for example, converting blue light into red light. Certainly, the invention provides no limitation to the color converted by the first wavelength conversion member 132 and the second wavelength conversion member 134.

It should be pointed out that, in the embodiment, the adjustable reflector 120 operates in a continuous manner. In other words, the adjustable reflector 120 may stay at any position between the first position P1 and the second position P2. Therefore, the user may adjust the angle of the adjustable reflector 120 to a suitable position depending on the desired light color, such that the light is incident to the first wavelength conversion member 132, the second wavelength conversion member 134, or a boundary between the first wavelength conversion member 132 and the second wavelength conversion member 134 so as to acquire the light with desired color such as yellow light, red light, orange light or white light. In particular, the first wavelength conversion member 132, the second wavelength conversion member 134, or the boundary between the first wavelength conversion member 132 and the second wavelength conversion member 134 may correspondingly have, for example, wavelength conversion members with different colors and shades depending on any position between the first position P1 and the second position P2 so that there are more flexible options, which should not be construed as a limitation to the invention.

However, in other embodiment, the adjustable reflector 120 may operate in a step-by-step manner. That is to say, the adjustable reflector 120 may have zero or multiple pauses between the first position P1 and the second position P2. When the adjustable reflector 120 is adjusted, the adjustable reflector 120 can only be rotated to a specific position. The designer may preset the pause angle of the adjustable reflector 120 so as for the user to choose the mostly desired angle from the positions of the adjustable reflector 120 and acquire the light with desired color with configuration of the wavelength conversion set 130.

In the embodiment, the light source 110 is exemplified as a laser light, which has the characteristic of high directivity that allows light to be accurately incident to the first wavelength conversion member 132, the second wavelength conversion member 134, or the boundary between the first wavelength conversion member 132 and the second wavelength conversion member 134. Certainly, other light sources that have good directivity may be used as the light source 110; the invention provides no limitation to the type of the light source 110.

In the embodiment, the optical module 100 further includes a lens set 140 and a reflective cover 150. The wavelength conversion set 130 and the reflective cover 150 are configured between the adjustable reflector 120 and the lens set 140. The bottom of the reflective cover 150 has an opening 152, and the wavelength conversion set 130 is disposed in the opening 152 at the bottom of the reflective cover 150.

The lens set 140 adjusts the optical type of the light emitted from the optical module 100. The reflective cover 150 makes the light to focus in the direction of the lens set 140. The lens set 140 may include a convergence lens. If the wavelength conversion set 130 is disposed at the focal point position of the lens set 140, the light that leaves the optical module 100 may be incident as in parallel form. In an embodiment, the lens set 140 may include a Fresnel lens which has a smaller size so as to reduce the overall size of the optical module 100. Certainly, the type of lens set 140 may vary depending on the desired optical type, and the invention provides no limitation thereto.

In the embodiment, the optical module 100 requires only little space for the adjustable reflector 120 to rotate and adjust the color of the light that emits from the optical module 100. The optical module 100 not only has the advantage of easily adjusting emission color but also has a small size. In the embodiment, the optical module 100 may be applied to a fill-light lamp for a mobile phone. However, in other embodiment, the optical module 100 may also be applied to a lighting apparatus such as a projection device, a vehicle lamp, an external flash light or a flashlight and the like. The invention provides no limitation to the application field of the optical module 100.

Figure 3:
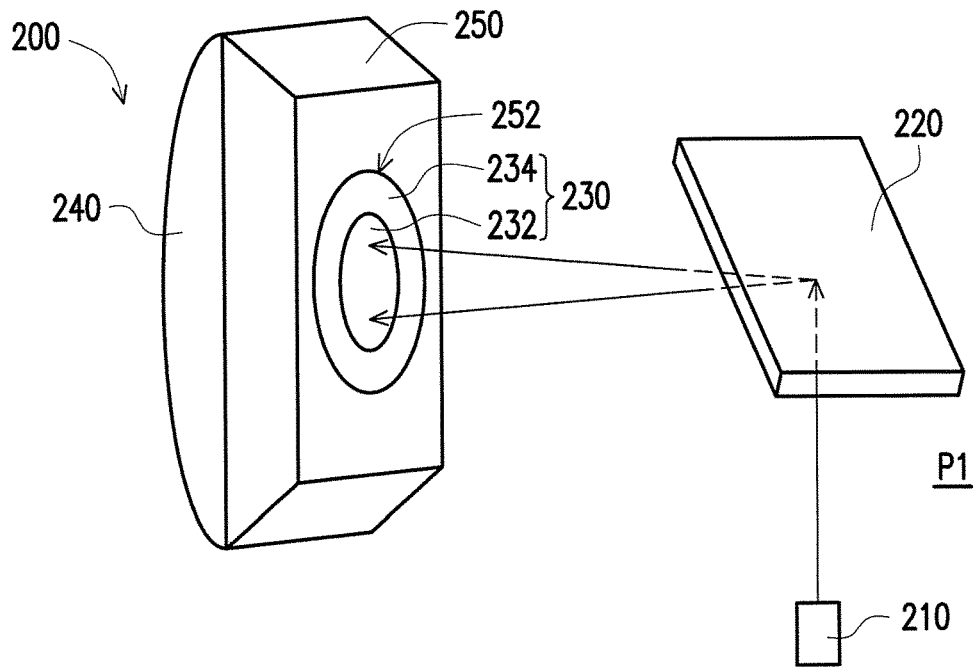
FIG. 3 is a schematic view illustrating that an adjustable light source of an optical module is at a first position according to another embodiment of the invention.
Figure 4:
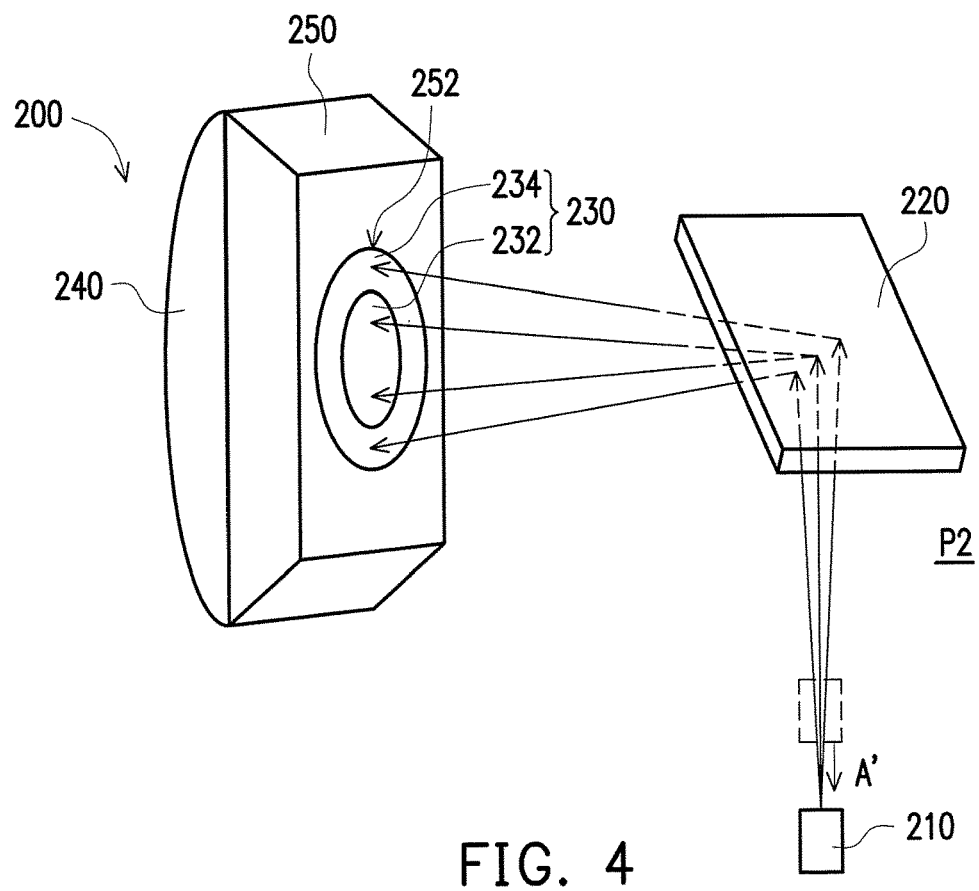
FIG. 4 is a schematic view illustrating that the adjustable light source of the optical module in FIG. 3 is at a second position.

FIG. 3 is a schematic view illustrating that an adjustable light source of an optical module is at a first position according to another embodiment of the invention. FIG. 4 is a schematic view illustrating that the adjustable light source of the optical module in FIG. 3 is at a second position. Referring to FIGS. 3-4, an optical module 200 of the embodiment includes an adjustable light source 210, a reflector 220 and a wavelength conversion set 230.

In the embodiment, the adjustable light source 210 is exemplified as a laser light source which has the characteristic of high directivity. Certainly, other light source that has good directivity may be used as the adjustable light source 210; the invention provides no limitation to the type of the adjustable light source 210. The adjustable light source 210 is adaptable to move along an axis A' between a first position P1 and a second position P2.

The reflector 220 is disposed in a light path of the light emitted by the adjustable light source 210. When the adjustable light source 210 is at the first position P1, a distance between the adjustable light source 210 and the reflector 220 is smaller than a distance between the adjustable light source 210 and the reflector 220 when the adjustable light source 210 is at the second position P2. In other words, when the adjustable light source 210 is at the first position P1, the adjustable light source 210 is close to the reflector 220; when the adjustable light source 210 is at the second position P2, the adjustable light source 210 is farther from the reflector 220.

The wavelength conversion set 230 includes a first wavelength conversion member 232 at the center and a second wavelength conversion member 234 surrounding the first wavelength conversion member 232. The first wavelength conversion member 232 and the second wavelength conversion member 234 respectively cover the wavelength of the light emitted by the adjustable light source 210 into the wavelength of other light. Here, two wavelength conversion members are disclosed; however, in other embodiment that is not disclosed, the wavelength conversion set may include more than two wavelength conversion members, such as multiple wavelength conversion members arranged in a matrix, which should not be construed as a limitation.

It should be indicated that although the adjustable light source 210 is exemplified as a laser light having good directivity, when the light moves, it is inevitable that the light is slightly diverged. In the embodiment, the optical module 200 uses the characteristic that the light is diverged more when the light moves in a longer path, and adjustably arranges the adjustable light source 210 to be at the first position P1 that is closer to the reflector 220 and the second position P2 that is farther from the reflector 220.

Specifically, as shown by FIG. 3, when the adjustable light source 210 is at the first position P1 that is closer to the reflector 220, the light emitted by the adjustable light source 210 is more converged. Therefore, when the light is reflected to the wavelength conversion set 230 by the reflector 220, the light is only incident to a range of the first wavelength conversion member 230 in the center, and the wavelength of the light is only converted by the first wavelength conversion member 230. For example, the adjustable light source 210 that emits blue light is converted into yellow light by the first wavelength conversion member 230.

As shown by FIG. 4, when the adjustable light source 210 is at the second position P2 that is farther from the reflector 220, the light emitted by the adjustable light source 210 is more diverged. Therefore, when the light is reflected to the wavelength conversion set 230 by the reflector 220, the light is not only incident to the first wavelength conversion member 232 in the center but also incident to the second wavelength conversion member 234 at the outside, and the wavelength of the light is converted by both of the first wavelength conversion member 232 and second wavelength conversion member 234. For example, the adjustable light source 210 that emits blue light is converted into yellow light by the first wavelength conversion member 232, and converted into red light by the second wavelength conversion member 234. The blue light of which the wavelength is not converted is mixed with yellow light to be white light and added with red light to increase color rendering index and so on.

In FIGS. 3-4, the distance relation between the adjustable light source 210 and the reflector 220 is schematic only, which may be adjusted by the designer depending on actual circumstances. For example, if it is desired to reduce the distance difference of the distances between the adjustable light source 210 and the reflector 220 when the adjustable light source 210 is at the first position P1 and the second position P2 respectively, it may be attainable to achieve the above wavelength conversion condition by the means of reducing the range of the first wavelength conversion member 232 and the second wavelength conversion member 234. Certainly, if the optical module 200 is not restricted in size, the adjustable light source 210 may be configured to be farther from or closer to the reflector 220 so as to test which position that the adjustable light source 210 should be disposed in order to obtain the light with desired color.

In addition, in the embodiment, the adjustable light source 210 may move in a continuous manner or step-by-step manner, such that the user may adjust the distance between the adjustable light source 210 and the reflector 220 depending on the desired light color. In that case, the light is incident to the first wavelength conversion member 232 only, or incident to the first wavelength conversion member 232 and the second wavelength conversion member 234 at the same time, such that the desired light color such as yellow color, orange color or white color can be attained.

In addition, in the embodiment, the optical module 200 further includes a lens set 240 and a reflective cover 250. The wavelength conversion set 230 and the reflective cover 250 are disposed between the reflector 220 and the lens set 240. The bottom of the reflective cover 250 has an opening 252, and the wavelength conversion set 230 is disposed in the opening 252 at the bottom of the reflective cover 250.

The lens set 240 adjusts the optical type of the light emitted from the optical module 220. The reflective cover 250 makes the light to be emitted toward the direction of the lens set 240. The lens set 240 may include a convergence lens. If the wavelength conversion set 230 is disposed in the focal point position of the lens set 240, the light that leaves the optical module 200 may be emitted in the form of parallel light. In an embodiment, the lens set 240 may include a Fresnel lens which has a smaller size and helps to reduce the overall size of the optical module 200. Certainly, the type of the lens set 240 may vary depending on the optical type needed by the user, which should not be construed as a limitation to the invention.

In summary, the optical module of the invention adjusts the position of the reflector or the light source to change to the light to be incident to the first wavelength conversion member, second wavelength conversion member, the boundary of the first wavelength conversion member and second wavelength conversion member, or to the first wavelength conversion member and the second wavelength conversion member at the same time, such that the light that leaves the optical module may have a different color to meet the user's need. The optical module is not only easy to use, but also it only requires little space for the reflector to rotate or for the light source to move; therefore, the optical module may have a smaller size.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. An optical module, comprising:
    a light source;
    an adjustable reflector disposed in a light path of light emitted by the light source, and adaptable to adjust between a first position and a second position; and
    a wavelength conversion set comprising a first wavelength conversion member and a second wavelength conversion member;
    a reflective cover having a through-hole and the wavelength conversion set being disposed in the through-hole of the reflective cover, wherein a total of a width of a surface of the first wavelength conversion member facing towards the adjustable reflector and a width of a surface of the second wavelength conversion member facing towards the adjustable reflector of the wavelength conversion set equals a total width of the through-hole, and the surface of the first wavelength conversion member facing towards the adjustable reflector, the surface of the second wavelength conversion member facing towards the adjustable reflector and a surface of the reflective cover facing towards the adjustable reflector are coplanar, wherein
    when the adjustable reflector is at the first position, the light emitted by the light source is reflected to the first wavelength conversion member by the adjustable reflector,
    when the adjustable reflector is at the second position, the light emitted by the light source is reflected to the second wavelength conversion member by the adjustable reflector.

2. The optical module according to claim 1, wherein the adjustable reflector adjusts in a continuous manner.

3. The optical module according to claim 1, wherein the adjustable reflector adjusts in a step-by-step manner.

4. The optical module according to claim 1, further comprising:
    a lens set, and the wavelength conversion set being disposed between the adjustable reflector and the lens set.

5. The optical module according to claim 4, wherein the wavelength conversion set is disposed on a focal point of the lens set.

6. The optical module according to claim 1, wherein the light source is a laser light source.

7. The optical module according to claim 1, wherein the through-hole is completely filled by the first wavelength conversion member and the second wavelength conversion member.

8. An optical module, comprising:
    an adjustable light source adaptable to move along an axis between a first position and a second position;
    a reflector disposed in a light path of light emitted by the adjustable light source; and
    a wavelength conversion set comprising a first wavelength conversion member and a second wavelength conversion member surrounding the first wavelength conversion member;
    a reflective cover having a through-hole and the wavelength conversion set being disposed in the through-hole of the reflective cover, wherein a total of a width of a surface of the first wavelength conversion member facing towards the adjustable reflector and a width of a surface of the second wavelength conversion member facing towards the adjustable reflector of the wavelength conversion set equals a total width of the through-hole, and the surface of the first wavelength conversion member facing towards the adjustable reflector, the surface of the second wavelength conversion member facing towards the adjustable reflector and a surface of the reflective cover facing towards the adjustable reflector are coplanar, wherein when the adjustable light source is at the first position, the light emitted by the adjustable light source is reflected to only the first wavelength conversion member by the reflector, when the adjustable light source is at the second position, the light emitted by the adjustable light source is concurrently reflected to both the first wavelength conversion member and the second wavelength conversion member by the reflector.

9. The optical module according to claim 8, wherein the adjustable light source moves in a continuous manner.

10. The optical module according to claim 8, wherein the adjustable light source moves in a step-by-step manner.

11. The optical module according to claim 8, further comprising:
a lens set, and the wavelength conversion set being disposed between the reflector and the lens set.

12. The optical module according to claim 11, wherein the wavelength conversion set is disposed on a focal point of the lens set.

13. The optical module according to claim 8, wherein the light source is a laser light source.

14. The optical module according to claim 8, wherein the through-hole is completely filled by the first wavelength conversion member and the second wavelength conversion member.

15. An optical module, comprising:
a light source;
an adjustable reflector disposed in a light path of light emitted by the light source, and adaptable to adjust between a first position and a second position; and
a wavelength conversion set comprising a first wavelength conversion member and a second wavelength conversion member;
a reflective cover having a through-hole and the wavelength conversion set being disposed conformally in the through-hole of the reflective cover, and the first wavelength conversion member and the second wavelength conversion member respectively contact the reflective cover, wherein a total of a width of a surface of the first wavelength conversion member facing towards the adjustable reflector and a width of a surface of the second wavelength conversion member facing towards the adjustable reflector of the wavelength conversion set equals a total width of the through-hole, and the surface of the first wavelength conversion member facing towards the adjustable reflector, the surface of the second wavelength conversion member facing towards the adjustable reflector and a surface of the reflective cover facing towards the adjustable reflector are coplanar, wherein
when the adjustable reflector is at the second position, the light emitted by the light source is reflected to the second wavelength conversion ember by the adjustable reflector.

* * * * *